(12) United States Patent
Kawano et al.

(10) Patent No.: US 10,316,808 B2
(45) Date of Patent: Jun. 11, 2019

(54) HIGH PRESSURE FUEL SUPPLY PUMP WITH ELECTROMAGNETIC SUCTION VALVE

(71) Applicant: HITACHI AUTOMOTIVE SYSTEMS, LTD., Hitachinaka-shi, Ibaraki (JP)

(72) Inventors: Tatsuo Kawano, Hitachinaka (JP); Kenichiro Tokuo, Tokyo (JP); Satoshi Usui, Hitachinaka (JP); Hiroyuki Yamada, Hitachinaka (JP); Katsumi Miyazaki, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/893,012

(22) Filed: Feb. 9, 2018

(65) Prior Publication Data

US 2018/0163683 A1    Jun. 14, 2018

Related U.S. Application Data

(63) Continuation of application No. 15/019,699, filed on Feb. 9, 2016, now Pat. No. 9,920,727, which is a
(Continued)

(30) Foreign Application Priority Data

Jun. 1, 2011 (JP) ................................. 2011-123026

(51) Int. Cl.
*F02M 59/46* (2006.01)
*F16K 31/06* (2006.01)
(Continued)

(52) U.S. Cl.
CPC ........ *F02M 59/466* (2013.01); *F02M 59/366* (2013.01); *F02M 59/368* (2013.01);
(Continued)

(58) Field of Classification Search
CPC ...... F04B 49/225; F04B 49/243; F04B 53/10; F04B 53/1082; F04B 7/0076;
(Continued)

(56) References Cited

U.S. PATENT DOCUMENTS 6,345,608 B1 * 2/2002 Rembold ............... F02M 59/34
 123/506
2006/0201485 A1 * 9/2006 Usui ....................... F02D 41/20
 123/458

(Continued)

FOREIGN PATENT DOCUMENTS

DE    10 2009 046 088 A1    5/2011
DE        102009046088 A1 *  5/2011    ......... F02M 37/0023
(Continued)

*Primary Examiner* — Dominick L Plakkoottam
(74) *Attorney, Agent, or Firm* — Volpe and Koenig, P.C.

(57) ABSTRACT

To reduce collision noise created by the operation of an electromagnetic suction valve provided on a high pressure fuel supply pump, the mass of a member which collides by magnetic attractive force is reduced. The noise generated when a core and an anchor collide with each other by magnetic attractive force depends on the magnitude of the kinetic energy of a moving element. The kinetic energy to be consumed in the collision is only the kinetic energy of the anchor. The kinetic energy of a rod, being absorbed by a spring, does not contribute to the noise; thus, the energy when the anchor and the core collide with each other can be reduced, whereby the noise to be created can be reduced.

9 Claims, 6 Drawing Sheets

Related U.S. Application Data continuation of application No. 14/119,787, filed as application No. PCT/JP2012/064193 on May 31, 2012, now Pat. No. 9,267,496.

(51) Int. Cl.

| | |
|---|---|
| *F04B 53/10* | (2006.01) |
| *F02M 59/36* | (2006.01) |
| *F04B 49/24* | (2006.01) |
| *F04B 7/00* | (2006.01) |
| *F02M 63/00* | (2006.01) |
| *F02M 59/48* | (2006.01) |
| *F02M 59/02* | (2006.01) |
| *F02M 37/00* | (2006.01) |

(52) U.S. Cl.
CPC ........ *F02M 59/462* (2013.01); *F02M 59/485* (2013.01); *F02M 63/0017* (2013.01); *F02M 63/0021* (2013.01); *F02M 63/0075* (2013.01); *F04B 7/0003* (2013.01); *F04B 49/243* (2013.01); *F04B 53/10* (2013.01); *F04B 53/1082* (2013.01); *F16K 31/0696* (2013.01); *F02M 37/0023* (2013.01); *F02M 59/025* (2013.01); *F02M 2200/09* (2013.01); *F02M 2200/502* (2013.01)

(58) Field of Classification Search
CPC ............. F02M 37/0023; F02M 59/366; F02M 59/367; F02M 63/0017; F02M 63/0021; F02M 63/0075; F02M 2200/315; F02M 59/368; F02M 63/0019; F02M 63/0225
See application file for complete search history.

(56) References Cited

U.S. PATENT DOCUMENTS

| | | | |
|---|---|---|---|
| 2009/0097997 A1 | 4/2009 | Suzuki et al. | |
| 2009/0120412 A1* | 5/2009 | Tokuo | F02M 59/102 123/506 |
| 2009/0301441 A1* | 12/2009 | Hasegawa | F02D 41/20 123/476 |
| 2012/0093670 A1* | 4/2012 | Usui | F02M 63/0017 417/505 |
| 2012/0301340 A1* | 11/2012 | Aritomi | F02M 59/366 417/505 |

FOREIGN PATENT DOCUMENTS

| | | |
|---|---|---|
| JP | 2002-048033 A | 2/2002 |
| JP | 2003-148292 A | 5/2003 |
| JP | 2009-041420 A | 2/2009 |
| JP | 2009-108847 A | 5/2009 |
| JP | 2010-014121 A | 1/2010 |
| JP | 2012-082809 A | 4/2012 |
| JP | 2012-082810 A | 4/2012 |
| JP | 2013-032750 A | 2/2013 |
| JP | 2013-148025 A | 8/2013 |

\* cited by examiner

HIGH PRESSURE FUEL SUPPLY PUMP WITH ELECTROMAGNETIC SUCTION VALVE

TECHNICAL FIELD

The present invention relates to a high pressure fuel supply pump for pumping high pressure fuel to an fuel injection valve of an internal combustion engine, in particular, to a high pressure fuel supply pump equipped with an electromagnetic suction valve for adjusting the volume of discharged fuel.

BACKGROUND ART

In a high pressure fuel supply pump equipped with a conventional electromagnetic suction valve described in JP 2002-48033 A, the electromagnetic suction valve is in a valve-opened state where the suction valve is opened by a biasing force of a spring when an electromagnetic coil is not supplied with current. When the electromagnetic coil is supplied with current, the suction valve is closed by magnetic attractive force generated in the electromagnetic suction valve. Accordingly, the opening-closing motion of the suction valve can be controlled by existence and non-existence of the current in the electromagnetic coil; consequently, the supply amount of high pressure fuel can be controlled.

CITATION LIST

Patent Literature

PTL 1: JP 2002-48033 A

SUMMARY OF INVENTION

Technical Problem

When the electromagnetic coil is supplied with current, magnetic attractive force is generated between a core and an anchor, and the anchor, which is a moving element, starts to move in a valve-closing direction of the suction valve. There has been a problem that the anchor stops when colliding with the core, and a large noise is created due to impact at that time. In particular, the noise has been a problem in an idling operation state of a vehicle in which quietness is required.

An object of the present invention is to reduce collision noise generated in an electromagnetic suction valve in a high pressure fuel supply pump.

Solution to Problem

In the present invention, in order to achieve the object, the mass of a member which makes a collision by magnetic attractive force is made small to reduce the noise to be generated. For this purpose, a configuration is made in which a moving element which moves by magnetic attractive force is divided into two parts (an anchor and a rod), and even if the anchor collides with the core and the anchor stops moving, the rod continues to move. Preferably, kinetic energy of the rod is absorbed by a biasing force of a spring which biases the suction valve in a valve-opening direction.

Advantageous Effects of Invention

The present invention configured in this way provides the following advantageous effects.

The noise created when the core and the anchor collides with each other by magnetic attractive force depends on the magnitude of the kinetic energy of the moving element. The kinetic energy consumed by the collision is only the kinetic energy of the anchor. The kinetic energy of the rod is absorbed by the biasing force of the spring and does not contribute to the noise. Therefore, the energy at the collision between the anchor and the core can be made small, and the noise to be generated can be accordingly reduced.

DESCRIPTION OF EMBODIMENTS

Figure 1:
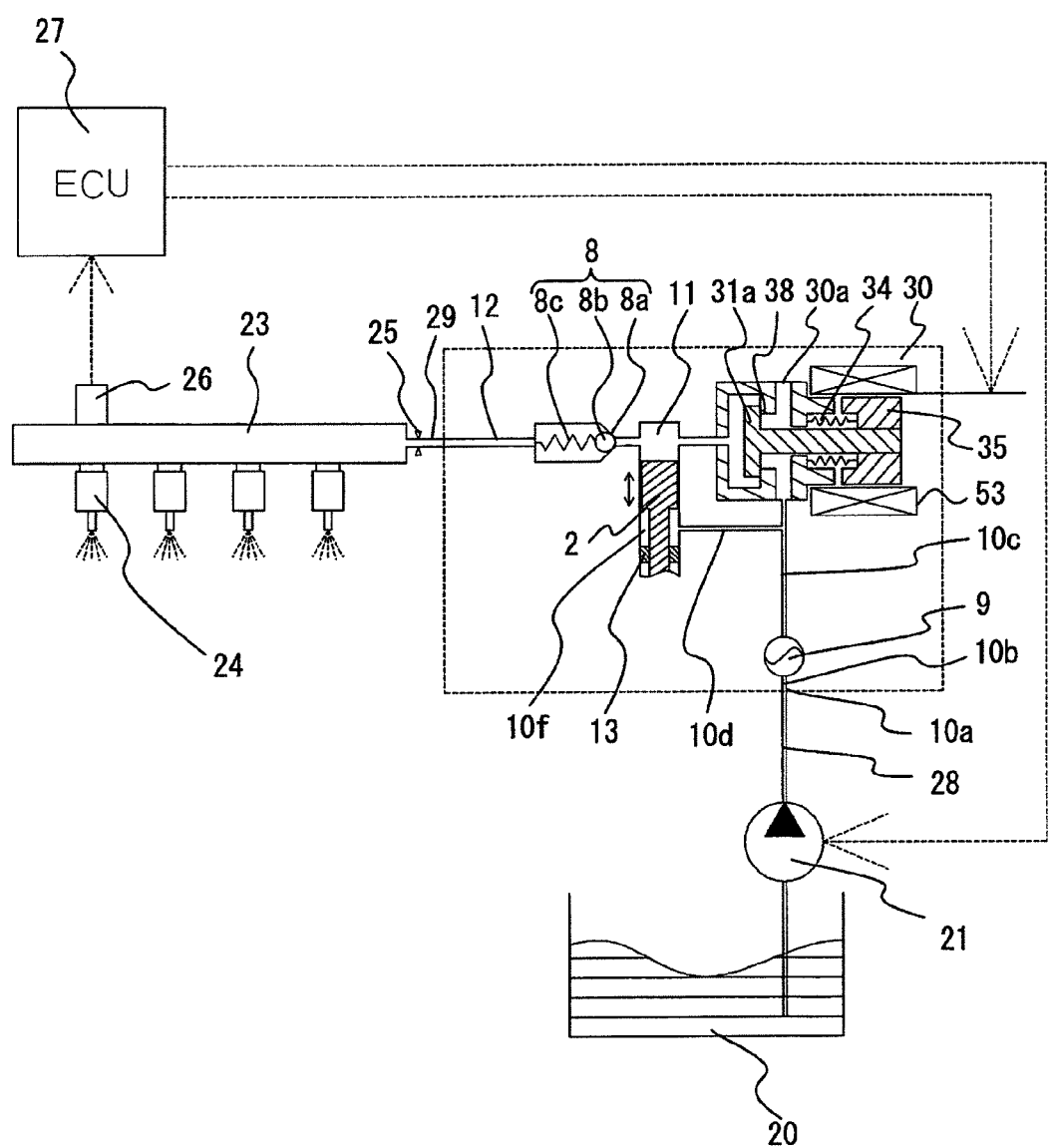
FIG. 1 is an example of a diagram of a fuel supply system including a high pressure fuel supply pump according to a first embodiment in which the present invention is practiced.

Based on an embodiment shown in the drawings, the present invention will be described in detail below.

[First Embodiment]

Based on FIG. 1 to FIG. 6, a configuration of a high pressure fuel supply pump of an embodiment of the present invention will be described.

In FIG. 1, the part surrounded by the broken line shows a pump housing 1 of the high pressure fuel supply pump, and shows that mechanisms and components illustrated in the broken line are integrally assembled into the pump housing 1 of the high pressure fuel supply pump.

Fuel in a fuel tank 20 is pumped up by a feed pump 21 based on a signal from an engine control unit 27 (hereinafter, referred to as ECU), is pressurized to an appropriate feed pressure, and is fed to a low pressure fuel suction opening 10*a* of the high pressure fuel supply pump through a suction pipe 28.

Figure 2:
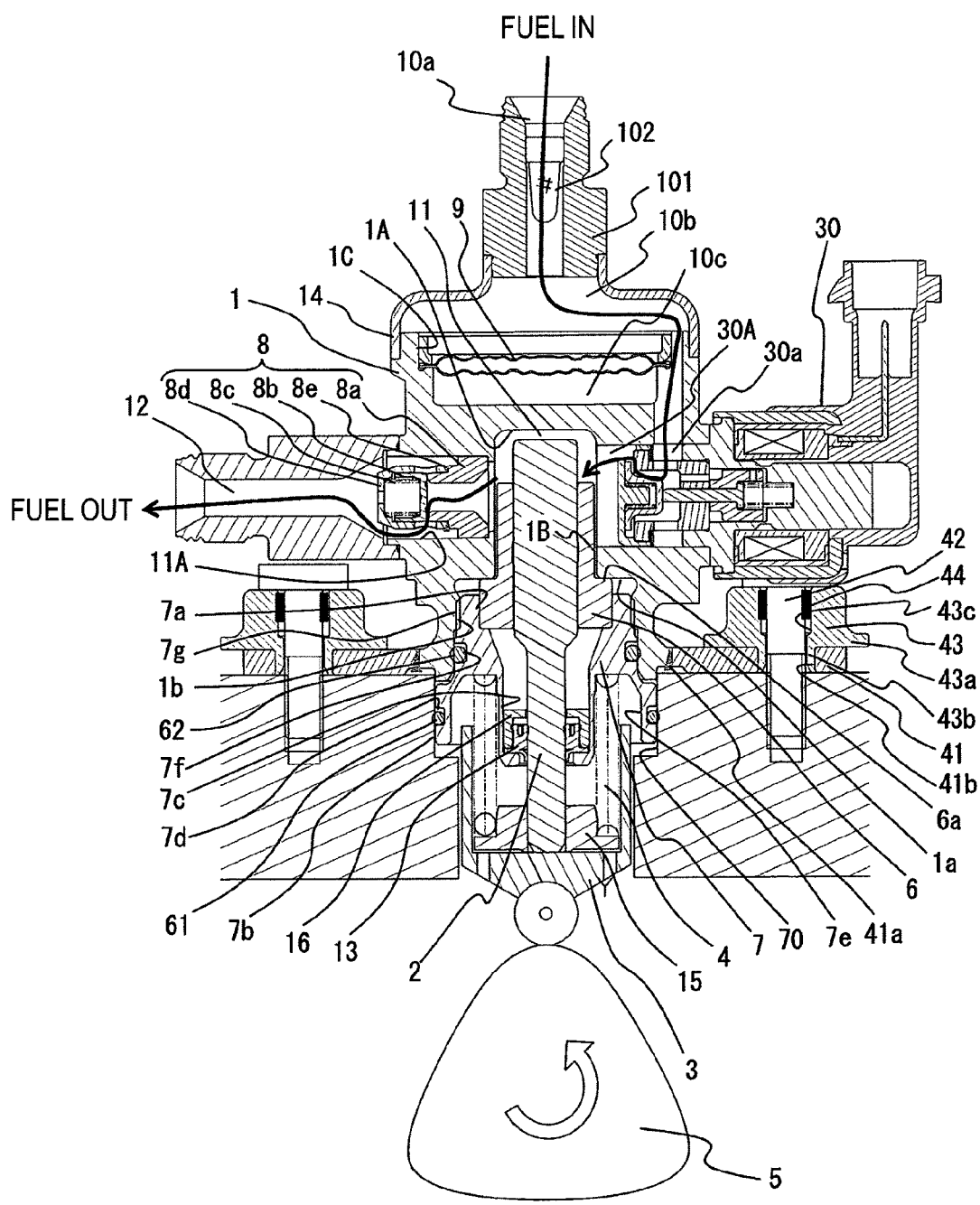
FIG. 2 is a vertical cross sectional view of a high pressure fuel supply pump according to the first embodiment in which the present invention is practiced.
Figure 3:
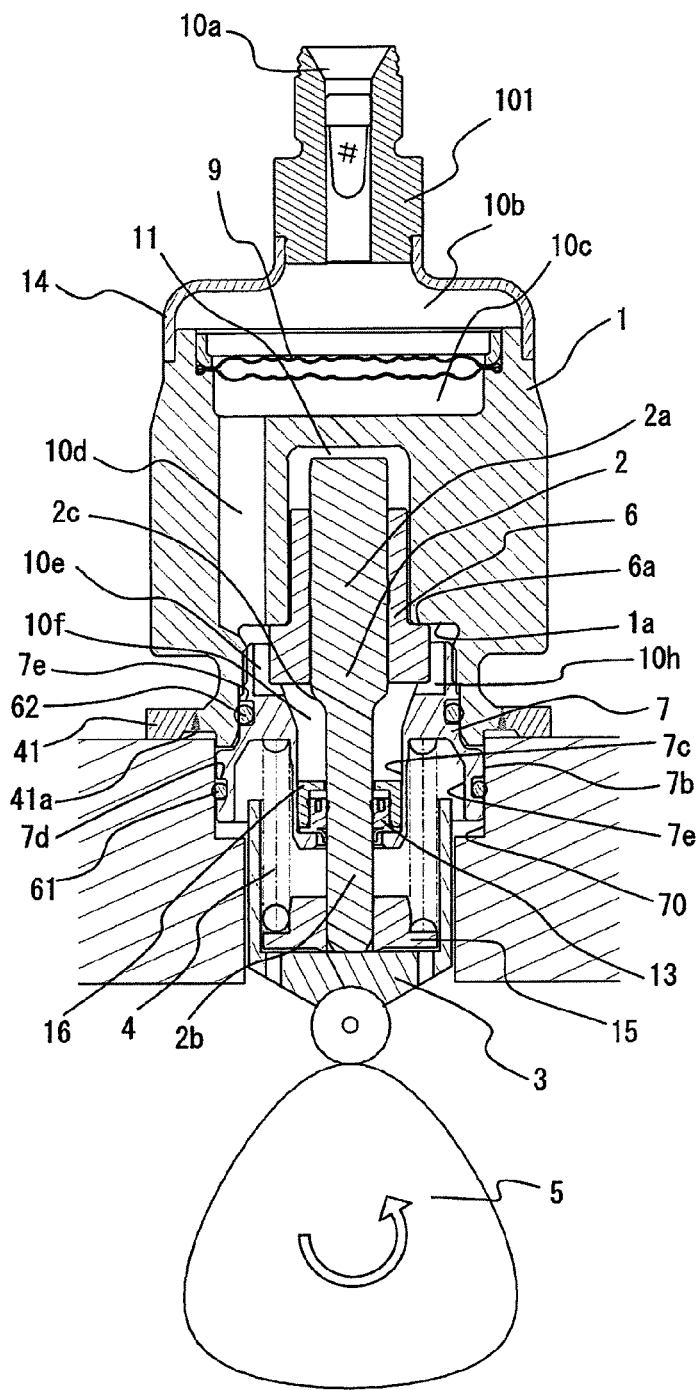
FIG. 3 is another vertical cross sectional view of a high pressure fuel supply pump according to the first embodiment in which the present invention is practiced.

In FIG. 2, on the top of the pump housing 1 is fixed a damper cover 14. On the damper cover 14 is provided a suction joint 101, which forms a low pressure fuel suction opening 10*a*. The fuel having passed through the low pressure fuel suction opening 10*a* passes through a suction filter 102 fixed inside the suction joint 101, and reaches a suction port 30*a* of an electromagnetic suction valve 30 further through a low pressure fuel flow path 10*b*, a pressure pulsation reduction mechanism 9, and a low pressure fuel flow path 10*c*.

The suction filter 102 in the suction joint 101 has a function of preventing the foreign matters which reside from the fuel tank 20 to the low pressure fuel suction opening 10a from being taken into the high pressure fuel supply pump by the flow of the fuel.

Figure 4:
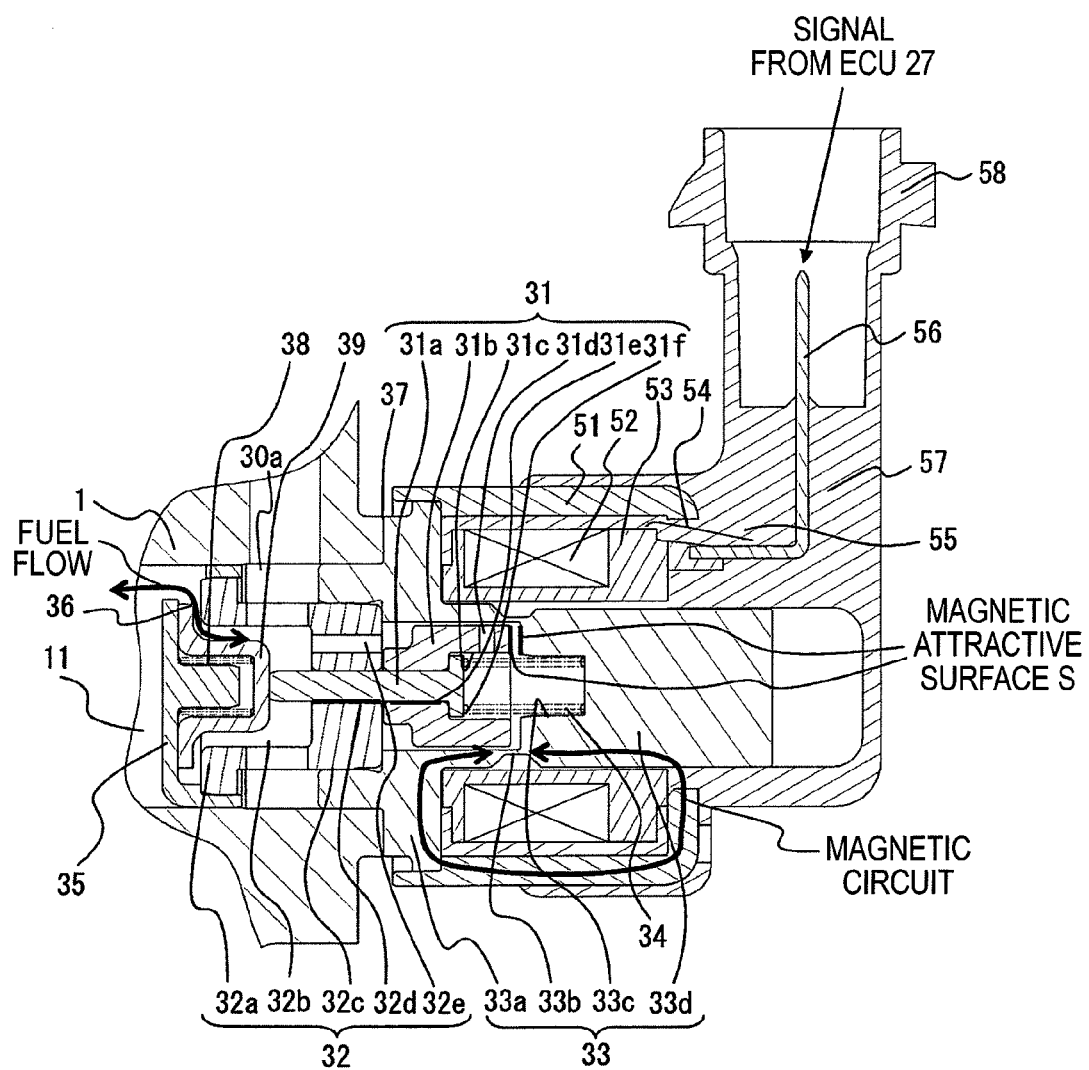
FIG. 4 is an enlarged cross-sectional view of an electromagnetic suction valve in a high pressure fuel supply pump according to the first embodiment in which the present invention is practiced, and shows a state where the electromagnetic suction valve is in a valve-opened state.

In the pump housing 1, there is formed a convex part 1A as a compression chamber 11 at the center, and in an suction port 30a at the entrance of the compression chamber 11 there is provided an electromagnetic suction valve 30. Inside the electromagnetic suction valve 30 is provided a moving element 31 configured with an anchor 31b and a rod 31a. In the electromagnetic suction valve 30, when an electromagnetic coil 52 is not supplied with current, the moving element 31 is moved leftward in the drawing as shown in FIG. 4 by the difference between the biasing force of an anchor spring 34 and the biasing force of an suction valve spring 38, and an suction valve 39 is in contact with an suction valve holder 35 to be in a valve-opened state. Thus, the electromagnetic suction valve 30 communicates the suction port 30a and the compression chamber 11 when the electromagnetic coil 52 is not supplied with current.

The outer periphery of a cylinder 6 is held by a cylindrical fitting part 7a of a cylinder holder 7. With a thread 7g cut in the outer periphery of the cylinder holder 7 being screwed into a thread 1b cut in the pump housing 1, the cylinder 6 is fixed to the pump housing 1. In addition, a plunger seal 13 is held on the lower end of the cylinder holder 7 by a seat holder 16 which is press-fit and fixed to an inner periphery cylindrical surface 7c of the cylinder holder 7 and by the cylinder holder 7. Here, the axis of the plunger seal 13 is held coaxially with the axis of the cylindrical fitting part 7a by the inner periphery cylindrical surface 7c of the cylinder holder 7. A plunger 2 and the plunger seal 13 are disposed slidably in contact with each other at the lower end, in the drawing, of the cylinder 6.

This arrangement prevents the fuel in the circular low pressure seal chamber 10f from flowing into the side of the tappet 3, in other words, into the inside of the engine. At the same time, this arrangement prevent lubricant oil (including engine oil) for lubricating sliding parts in an engine housing from flowing into the inside of the pump housing 1.

Further, on the cylinder holder 7 is provided an outer peripheral cylindrical surface 7b, and in the outer peripheral cylindrical surface 7b is provided a groove 7d, in which an O-ring 61 is to be fit. The O-ring 61, together with the inner wall of a fitting hole 70 in the engine side and the groove 7d in the cylinder holder 7, secludes the cam side and the outside of the engine from each other and thus prevents the engine oil from leaking outside.

The cylinder 6 has a pressure-bonding part 6a intersecting the direction of a reciprocating motion of the plunger 2, and the pressure-bonding part 6a is in pressure contact with a pressure-bonding surface 1a of the pump housing 1. The pressure contact is made by the force of a tightened screw. The compression chamber 11 is formed by this pressure contact, and the tightening torque of the screw must be controlled so that the fuel does not leak outside the compression chamber 11 through the pressure-bonding part even if the fuel in the compression chamber 11 is pressurized to a high pressure.

In addition, in order to keep the sliding distance between the plunger 2 and the cylinder 6 in an appropriate range, a configuration is made such that the cylinder 6 is inserted deep into the compression chamber 11. There is provided a clearance 1B between the outer periphery of the cylinder 6 and the inner periphery of the pump housing 1 on the side of the compression chamber 11 from the pressure-bonding part 6a of the cylinder 6. Since the outer periphery of the cylinder 6 is held by the cylindrical fitting part 7a of the cylinder holder 7, it can be possible to prevent the outer periphery of the cylinder 6 and the inner periphery of the pump housing 1 from being in contact with each other by providing the clearance 1B.

In the manner described above, the cylinder 6 holds the plunger 2, which performs a back-and-forth motion in the compression chamber 11, slidably in the direction of the back-and-forth motion.

At the lower end of the plunger 2, a retainer 15 is fixed to the plunger 2 by fitting. The retainer 15 converts the rotational motion of a cam 5 into an up-and-down motion and transfers the motion to the plunger 2, and the plunger 2 is pressed through the intermediary of the retainer 15 by a spring 4 against the inner surface of the bottom of a tappet 3. This arrangement enables the plunger 2 to move up and down with the rotational motion of the cam 5.

In the case that the cam 5 is a three point cam (having three points of a cam) shown in FIG. 2, one rotation of a crankshaft or an overhead camshaft makes the plunger 2 reciprocate three times. In the case of a four cycle engine, the crankshaft rotates twice in one combustion stroke. In the case of a three point cam, when the crankshaft rotates the cam 5, the plunger reciprocates 6 times in one combustion cycle (basically, the fuel injection valve injects fuel into the cylinder once) and pressurizes the fuel 6 times and discharges the fuel from a fuel discharge port 12.

At an outlet of the compression chamber 11 is provided a discharge valve unit 8. The discharge valve unit 8 is configured with a discharge valve seat 8a, a discharge valve 8b which comes in contact with and separates from the discharge valve seat 8a, a discharge valve spring 8c biasing the discharge valve 8b against the discharge valve seat 8a, and a discharge valve stopper 8d containing therein the discharge valve 8b and the discharge valve seat 8a; and the discharge valve seat 8a and the discharge valve stopper 8d are bonded at a contact part with a welding 8e to make an integral unit.

In addition, inside the discharge valve stopper 8d is provided a stepped part 8f which limits the stroke of the discharge valve 8b.

In the state where there is no difference in fuel pressure between in the compression chamber 11 and in the fuel discharge port 12, the discharge valve 8b is in a valve-closed state, being pressure-contacted with the discharge valve seat 8a by a biasing force of the discharge valve spring 8c. Only after the fuel pressure in the compression chamber 11 becomes higher than the fuel pressure in the fuel discharge port 12, the discharge valve 8b is opened against the discharge valve spring 8c, whereby the fuel in the compression chamber 11 is discharged at high pressure into a common rail 23 through the fuel discharge port 12. The discharge valve 8b, when opening, comes in contact with the discharge valve stopper 8d to limit the stroke. Accordingly, the stroke of the discharge valve 8b is appropriately determined by the discharge valve stopper 8d. This arrangement can prevent the fuel discharged at high pressure into the fuel discharge port 12 from flowing back into the compression chamber 11 again because of the delay of closing the discharge valve 8b because of too large a stroke, whereby the efficiency of the high pressure pump can be prevented from decreasing. Further, so as to allow the discharge valve 8b to move only in the direction of the stroke when the discharge valve 8b repeatedly opens and closes, the inner periphery surface of the discharge valve stopper 8d guides the discharge valve 8b. With the above described arrangement, the discharge valve unit 8 works as a check valve for limiting the flow direction of the fuel.

With these configurations, the compression chamber 11 is configured with the pump housing 1, the electromagnetic suction valve 30, the plunger 2, the cylinder 6, and the discharge valve unit 8.

Thus, of the fuel introduced into the low pressure fuel suction opening 10a, a required amount is pressurized to a high pressure in the compression chamber 11 of the pump housing 1, which is a pump main body, by the reciprocating motion of the plunger 2 and is pumped to the common rail 23 from the fuel discharge port 12.

The common rail 23 is equipped with injectors 24 and a pressure sensor 26. The injectors 24 are provided in accordance with the number of cylinders in the internal combustion engine, and open and close valves in accordance with a control signal of the ECU 27 to inject the fuel into the cylinders.

The high pressure fuel supply pump is fixed on the engine by using a mounting flange 41, bolts 42, and bushes 43. The mounting flange 41 forms a circular fixing part with a full circumference thereof welded to the pump housing 1 on a welded part 41a. In this embodiment, laser welding is used.

FIG. 4 is an enlarged view of the electromagnetic suction valve 30 in the non-energized state where the electromagnetic coil 52 is not supplied with current.

Figure 5:
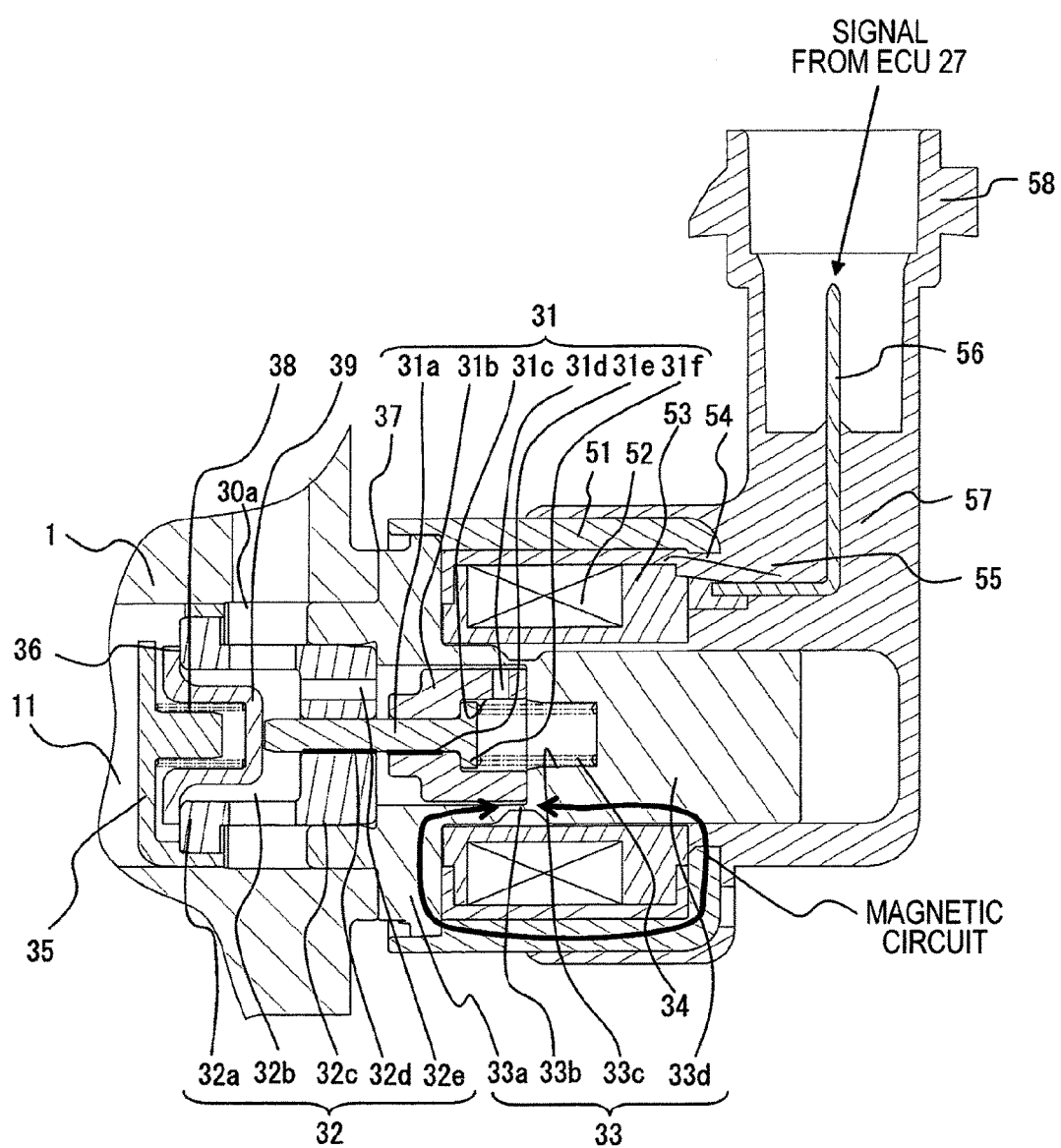
FIG. 5 is an enlarged cross-sectional view of the electromagnetic suction valve in the high pressure fuel supply pump according to the first embodiment in which the present invention is practiced, and shows a state where the electromagnetic suction valve is in a valve-closed state.

FIG. 5 is an enlarged view of the electromagnetic suction valve 30 in the state where the electromagnetic coil 52 is supplied with current.

The moving element 31 is made up of two parts: a rod 31a and an anchor 31b. The rod 31a and the anchor 31b are separate bodies, and between the rod 31a and the anchor 31b is provided a fine clearance. Since the rod 31a is slidably held also by a sliding part 32d of a valve seat 32 to be described later, the anchor 31b is slidably held by the rod 31a so that the motion is limited in the direction of a valve-opening motion and a valve-closing motion.

The suction valve spring 38 is fit in the suction valve 39 and the suction valve holder 35 as shown in FIG. 4, and the suction valve spring 38 generates a biasing force in the direction to separate the suction valve 39 and the suction valve holder 35.

The anchor spring 34 is fit in the anchor inner periphery 31c and the core inner periphery 33b as shown in FIG. 4, and the anchor spring 34 generates a biasing force in the direction to separate the anchor 31b and the core 33. Here, the biasing force of the anchor spring 34 is set larger than the biasing force of the suction valve spring 38. With this arrangement, in the state where the electromagnetic coil 52 is not supplied with current, the difference between the biasing force of the anchor spring 34 and the biasing force of the suction valve spring 38 biases the moving element 31 in the valve-opening direction, leftward in the drawing, as shown in FIG. 4 so that the suction valve 39 is in the valve-opened state.

The valve seat 32 is configured with a suction valve seat 32a, a suction path part 32b, a press-fitting part 32c, and a sliding part 32d. The press-fitting part 32c is press-fit and fixed in the core 33. The suction valve seat 32a is press-fit and fixed in the suction valve holder 35, and the suction valve holder 35 is further press-fit and fixed in the pump housing 1. This arrangement perfectly secludes the compression chamber 11 and the suction port 30a from each other. The sliding part 32d slidably holds the rod 31a.

The core 33 is configured with a first core part 33a, a magnetic orifice part 33b, a core inner periphery 33c, and a second core part 33d.

When the electromagnetic coil 52 is supplied with current, magnetic flux is generated by the magnetic field created around the electromagnetic coil 52 as shown in FIG. 4, whereby magnetic attractive force is generated between the anchor 31b and the core 33. In this embodiment, the components constituting the magnetic circuit are the anchor 31b, the core 33, a yoke 51 as shown in FIG. 4, and materials of these components are all magnetic materials. In order to increase the magnetic attractive force, it is only necessary to increase the magnetic flux passing through magnetic attractive surfaces S of the anchor 31b and the core 33. For this purpose, between the first core part 33a and the second core part 33d is provided a magnetic orifice part 33b. The magnetic orifice part 33b is made as thin as possible as far as strength allows, and at the same time the other parts of the core 33 are made to have enough thicknesses. Further, the magnetic orifice part 33b is provided in the vicinity of the place where the core 33 and the anchor 31b are in contact with each other. Since this arrangement can decrease the magnetic flux passing through the magnetic orifice part 33b of the core 33, most of the magnetic flux passes through the anchor 31b, whereby the decrease of the magnetic attractive force generated between the core 33 and the anchor 31b is kept within an allowable range.

If cross-sectional area of the magnetic orifice part 33b is too large, the magnetic flux directly passes between the first core part 33a and the second core part 33d, and the magnetic flux passing through the anchor 31b is accordingly reduced, thereby decreasing the magnetic attractive force. If the magnetic attractive force is small, the response of the moving element 31 is bad, so that the suction valve is not closed or it takes a longer time for the suction valve to be closed, whereby there arises a problem that the amount of the fuel discharged at high pressure cannot be controlled during high speed operation (during high speed rotation of the camshaft) of the internal combustion engine.

A configuration according to this embodiment does not need to use non-magnetic material for the magnetic orifice part 33b, and the core 33 can be manufactured as an integral component. As a result, the core 33 does not need to be connected with non-magnetic material by using press-fitting, welding, or the like when assembling the core 33, and machining and assembling of the components can be simplified.

The core 33 is fixed by welding to the pump housing 1 at the welded part 37, thereby secluding the suction port 30a and the outside of the high pressure fuel supply pump.

When the electromagnetic coil 52 is in the non-energized state where the electromagnetic coil 52 is not supplied with current and there is no difference in fluid pressure between in the low pressure fuel flow path 10c (suction port 30a) and in the compression chamber 11, the moving element 31 comes into a state where the moving element 31 has been moved leftward in the drawing as shown in FIG. 4 by the difference between the biasing forces of the anchor spring 34 and the suction valve spring 38. At this time, since the suction valve 39 comes in contact with the suction valve holder 35, the position of the suction valve 39 in the valve-opening direction is limited. In this state, the suction valve 39 is in the valve-opened state. The gap between the suction valve 39 and the valve seat 32 defines a movable range of the suction valve 39, and this gap corresponds to the stroke.

If the stroke is too large, it takes a longer time for the suction valve 39 to come in contact with the valve seat 32 and be perfectly closed after the suction valve 39 starts the valve-closing motion upon the energization of the electromagnetic coil 52. In addition, the distance between the anchor 31b and the core 33 is accordingly larger, whereby the magnetic attractive force to be generated becomes smaller. As a result, the response will be insufficient during the highspeed operation (during the high speed rotation of the camshaft) of the internal combustion engine; thus, the suction valve 39 cannot be closed at a targeted time, thereby creating a problem that the amount of the fuel discharged at high pressure cannot be controlled. If the stroke is too small, an orifice effect is larger at this part, and the pressure loss is higher. For example, in the case that the internal combustion engine is operated at high speed (high speed rotation of the camshaft) at a high fuel temperature such as 60° C., the fuel is vaporized in this part when the fuel flows from the low pressure fuel flow path 10*c* into the compression chamber 11 on an suction stroke, whereby the amount of fuel to be pressurized to a high pressure is decreased. As a result, there has been a problem that this issue leads to a decrease in the volume efficiency of the high pressure fuel supply pump. In addition, in the return stroke, when the internal combustion engine is operated at high speed (high speed rotation of the camshaft), the fluid force generated on the suction valve (the force in the valve-closing direction generated by the fuel flowing back from the compression chamber 11 to the low pressure fuel flow path 10*c*) becomes large. Thus, the suction valve 39 is closed at an unexpected time in the return stroke, thereby creating a problem that the amount of the fuel discharged at high pressure cannot be controlled. For these reasons, it is very important to control the stroke of the suction valve 39.

When a configuration is made as described in this embodiment, the stroke is determined only by the component dimensions of the suction valve holder 35 and the suction valve 39, whereby the variation of the stroke can be minimized by properly setting the tolerances of these components.

Further, the clearance between the anchor 31*b* and the core 33 must be set greater than the stroke between the suction valve 39 and the valve seat 32. If the clearance is smaller than the stroke, the anchor 31*b* collides with the core 33 before the suction valve 39 comes in contact with the valve seat 32 after the suction valve 39 starts the valve-closing motion upon the energization of the electromagnetic coil 52, whereby there arises a problem that the suction valve 39 does not come in contact with the valve seat 32, in other words, the suction valve 39 cannot come into the perfect valve-closed state. However, the clearance is too large, even if the electromagnetic coil 52 is supplied with current, sufficient magnetic attractive force is not generated. As a result, the moving element 31 cannot be closed, or the response becomes bad, whereby there arises a problem that the amount of the fuel discharged at high pressure when the internal combustion engine is operated at high speed (high speed rotation of the camshaft).

In a configuration according to this embodiment, the clearance is determined only by the dimensions of the components such as the suction valve holder 35, the valve seat 32, the rod 31*a*, the core 33, and the suction valve 39, whereby the variation of the clearance can be minimized by properly setting the tolerances of these component dimensions.

In the state of a suction stroke (during moving from the top dead center position to the bottom dead center position) where the plunger 2 is moved downward in FIG. 2 by the rotation of the cam 5, the electromagnetic coil 52 is not supplied with current. At this time, the suction valve 39 is open, whereby the volume of the compression chamber 11 is increased. In this stroke, the fuel flows from the suction port 30*a*, through the suction path part 32*b* of the valve seat 32 and a suction opening 36, and into the compression chamber 11. Here, since the amount of displacement of the suction valve 39 is limited by the suction valve holder 35, the suction valve 39 is not opened further.

In this state, the plunger 2 finishes the suction stroke, and then goes on to the compression stroke (ascending stroke for moving from the bottom dead center to the top dead center). The volume of the compression chamber 11 is decreased with the compression motion of the plunger 2; however, in this state, since the fuel once suctioned into the compression chamber 11 is returned back to the low pressure fuel flow path 10*c* (suction port 30*a*) through the suction opening 36 in the valve-opened state, the pressure in the compression chamber is not raised. This stroke is referred to as a return stroke.

At this time, to the suction valve 39, there are applied forces, one of which is in the valve-opening direction and is based on the difference between the biasing force of the anchor spring 34 and the biasing force of the suction valve spring 38, and the other of which is in the valve-closing direction and is based on the fluid force generated when the fuel flows from the compression chamber 11 back into the low pressure fuel flow path 10*c*. In order to keep the suction valve 39 open during the return stroke, the difference between the biasing forces of the anchor spring 34 and the suction valve spring 38 is set larger than the fluid force.

After the electromagnetic coil 52 in this state is supplied with current, magnetic attractive force is generated between the core 33 and the anchor 31*b* so that the core 33 and the anchor 31*b* attract each other; and when the magnetic attractive force becomes stronger than the difference between the biasing forces of the anchor spring 34 and the suction valve spring 38, the anchor 31*b* starts to move in the valve-closing direction.

The anchor 31*b* and the rod 31*a* are different bodies; however, when the anchor 31*b* has started in the valve-closing direction, the anchor 31*b* is engaged with a stopper part 31*f* of the rod 31*a*, and the anchor 31*b* starts to move with the rod 31*a* in the valve-closing direction. When the anchor 31*b* collides with the core 33, the anchor 31*b* stops moving and collision noise is created due to the kinetic energy which the anchor 31*b* has. Since the anchor 31*b* and the rod 31*a* are slidably held on each other at an anchor sliding part 31*e*, the rod 31*a* continues to move in the valve-closing direction even after the anchor 31*b* stopped moving upon colliding with core 33, and the rod 31*a* then stops moving with the kinetic energy absorbed by the anchor spring 34. Therefore, the kinetic energy of the rod 31*a* does not contribute to the noise. The configuration as described above can reduce the noise due to the collision with the core 33.

As described above, when the anchor 31*b* and the rod 31*a* move in the valve-closing direction, only the biasing force of the suction valve spring 38 is applied to the suction valve 39. Thus, the suction valve 39 is moved by the biasing force of the suction valve spring 38 in the valve-closing direction, and then comes into contact with the suction valve seat 32*a* to come into the valve-closed state, thereby closing the suction opening 36.

When the suction opening 36 is closed, the fuel pressure in the compression chamber 11 is raised with the ascending motion of the plunger 2. Then, when the pressure becomes higher than the pressure in the fuel discharge port 12, the fuel left in the compression chamber 11 is discharged at high pressure through the discharge valve unit (discharge valve mechanism) 8 and supplied to the common rail 23. This stroke is referred to as a discharge stroke. The compression stroke of the plunger 2 is thus constituted by a return stroke and the discharge stroke.

In a discharge stroke, after the pressurized fuel starts to be supplied, the supply of current to the electromagnetic coil 52 can be removed. This is because, when the pressure in the compression chamber 11 becomes higher than the pressure in the fuel discharge port 12, the force due to the pressure in the compression chamber 11 is applied to the suction valve 39 in the valve-closing direction, and the force becomes larger than the biasing force of the suction valve spring 38. Thus, the power consumption in the electromagnetic coil 52 can be reduced.

Further, by controlling the time at which the electromagnetic coil 52 of the electromagnetic suction valve 30 is supplied with current, the amount of the discharged high pressure fuel can be controlled.

When the electromagnetic coil 52 is supplied with current at a sooner time, the portion of the return stroke gets smaller and the portion of the compression stroke gets larger in the discharge stroke.

As a result, the smaller amount of fuel is returned to the low pressure fuel flow path 10c (suction port 30a) and the larger amount of fuel is discharged at high pressure.

Alternatively, when the electromagnetic coil 52 is supplied with current at a later time, the portion of the return stroke gets larger and the portion of the discharge stroke gets smaller in the compression stroke. As a result, the larger amount of fuel is returned to the low pressure fuel flow path 10c, and the smaller amount of fuel is discharged at high pressure. The time to supply current to the electromagnetic coil 52 is controlled by the instruction from the ECU 27.

When the plunger 2 finishes the compression stroke and starts the suction stroke, the volume of the compression chamber 11 starts to increase again, and the pressure in the compression chamber 11 decreases. Thus, the fuel flows into the compression chamber 11 from the low pressure fuel flow path 10c through the suction port 30a. The suction valve 39 starts the valve-opening motion leftward in the drawing due to the difference between the biasing forces of the anchor spring 34 and the suction valve spring 38; then, after having moved by the distance of the stroke, the suction valve 39 collides with the suction valve holder 35 and stops the motion. Since this collision is caused by the difference between the biasing forces of the anchor spring 34 and the suction valve spring 38, the energy of collision is not so large. Therefore, the collision part does not need to have high hardness. For this reason, this embodiment employs austenite stainless steel as the material for the suction valve holder 35. In addition, at this time, the anchor 31b is engaged with the stopper part 31f of the rod 31a and performs the valve-opening motion together with the rod 31a.

By configuring as described above and controlling the time to supply current to the electromagnetic coil 52, the amount of the fuel discharged at high pressure can be controlled to be the amount which the internal combustion engine requires.

At this time, the moving element 31 repeats the motion in the lateral direction in the drawing with the descending and ascending motion of the plunger 2, and the suction valve 39 repeats the opening-closing motion of the suction opening 36. Here, since there are fine clearances between the anchor 31b and the rod 31a of the moving element 31 and between the rod 31a and the valve seat 32, the moving element 31 is slidably held, with the motion being limited in the direction of the valve-opening motion and the valve-closing motion, thereby repeating a sliding motion. The clearances at the two sliding parts are set as follows. If the clearances are too large, the rod 31a and the anchor 31b move in a direction different from the valve-opening motion or the valve-closing motion. Then, the response of the valve-opening motion and the valve-closing motion will be bad, whereby the opening and closing of the suction valve 39 cannot follow during the high speed operation (during the high speed rotation of the camshaft) of the internal combustion engine, and the amount of the discharged high pressure fuel cannot be controlled. Therefore, the clearances need to be set have appropriate values. In addition, the anchor sliding part 31e and the sliding part 32d need to have sufficiently low surface roughness so as not to create friction against the valve-opening motion and the valve-closing motion of the moving element 31.

Further, since high hardness is required from the point of view of durability, martensite stainless steel having high hardness is used as the material for the suction valve 39, the valve seat 32 and the rod 31a.

The martensite stainless steel as the material for the rod 31a and the valve seat 32 is known as magnetic material, which creates magnetic flux therein when located in a magnetic field. Thus, a flow of magnetic flux is created in the rod 31a and the valve seat 32 through the anchor 31b, thereby generating magnetic attractive force with which the rod 31a and the valve seat 32 attract each other. However, in the configuration of this embodiment, most of the magnetic flux flows through only the magnetic attractive surface S between the anchor 31b and the core 33, whereby there is no possibility that the suction valve 39 cannot be opened.

In addition, when the moving element 31 repeats the valve-opening motion and the valve-closing motion, the rod 31a gets in and out of the internal cylindrical part of the core 33, whereby the volume of the fuel in the internal cylindrical part of the core 33 increases and decreases.

Since the internal cylindrical part of the core 33 is filled with fuel, when the rod 31a gets in and out of the internal cylindrical part of the core 33, the fuel displaced by the rod 31a have to reciprocates right and left in the drawing through a guide part 32d of the valve seat 32. However, the clearance between the guide part 32d and the rod 31a of the valve seat 32 is so thin that sufficient amount of fuel cannot pass through, thereby impeding the response of the valve-opening motion and the valve-closing motion of the moving element 31. To address this issue, a communication hole 32e is provided in the valve seat 32.

A volume of the space inside the cylindrical part constituted by the inner periphery surface of the anchor 31b and the inner periphery surface of the core 33 also increases and decreases with the valve-opening motion and the valve-closing motion of the moving element 31. Further, when the anchor 31b and the core 33 collides with each other, the space inside the cylindrical part becomes perfectly sealed; thus, there is a problem that at the moment when the anchor 31b leaves from the core 33 and moves onto the valve-opening motion, the pressure decreases, whereby the valve-opening motion of the moving element becomes unstable. To address this problem, an anchor communication hole 31d is provided in the anchor 31b.

The configuration as described above facilitates the fuel to pass through and secures the response of the valve-opening motion and the valve-closing motion of the moving element 31.

The electromagnetic coil 52 is configured with a lead wire 54 wound about the axis of the moving element 31. The both ends of the lead wire 54 are welded to the terminals 56 at the lead wire welded part 55. The terminals are made of conductive material and opened at a connector part 58, and when a connector from the ECU 27 is connected to the connector part 58, the terminals come in contact with the corresponding terminals and transfers current to the electromagnetic coil 52.

In this embodiment, the lead wire welded part 55 is positioned outside the yoke 51. Since the lead wire welded part 55 is positioned outside the magnetic circuit, the lead wire welded part 55 does not require the space for the lead wire welded part 55; therefore, the magnetic circuit can have a short overall length, which arrangement makes it possible to generate sufficient magnetic attractive force between the core 33 and the anchor 31b.

Figure 6:
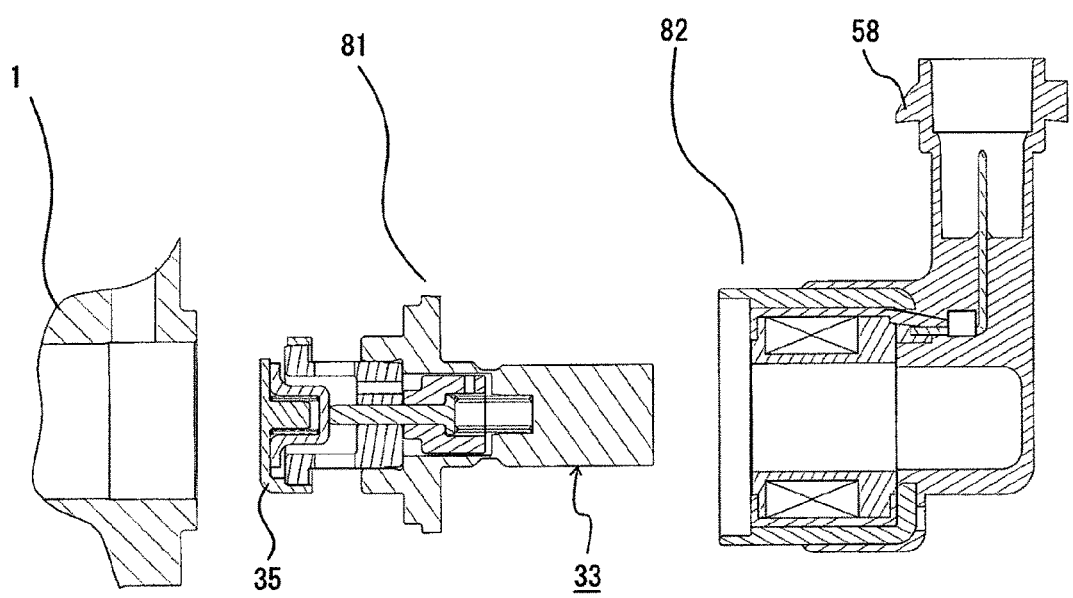
FIG. 6 shows a state before the electromagnetic suction valve of the high pressure fuel supply pump according to the first embodiment in which the present invention is practiced is assembled into a pump main body.

FIG. 6 shows the state before the electromagnetic suction valve 30 being assembled in the pump housing 1.

In this embodiment, a suction valve unit 81 and a connector unit 82 are made first as units. Next, the suction valve holder 35 of the suction valve unit 81 is press-fit and fixed to the pump housing 1, and welding is then performed at the welded part all around the circumference. In this embodiment, laser welding method is used for welding. In this state, the connector unit 82 is press-fit and fixed to the core 33. With this method, the direction of the connector part 58 can be freely selected.

In the above three strokes of the suction stroke, the return stroke, and the discharge stroke, the fuel gets in and out of the suction port 30a (low pressure fuel flow path 10c) all the time; thus, the fuel pressure has a cyclic pulsation. This pressure pulsation is absorbed and reduced in the pressure pulsation reduction mechanism 9, and the pressure pulsation is blocked from being transmitted to the suction pipe 28 which communicates from the feed pump 21 to the pump housing 1, thereby preventing breakage or the like of the suction pipe 28 and enabling the fuel to be supplied to the compression chamber 11 with stable fuel pressure fuel. Since the low pressure fuel flow path 10b is connected to the low pressure fuel flow path 10c, the fuel is well supplied to the both sides of the pressure pulsation reduction mechanism 9, thereby effectively reducing the pressure pulsation of the fuel.

The pressure pulsation reduction mechanism 9 is configured with two metal diaphragms, the outer peripheries of which are fixed by welding at a welded part at all the circumference with the space between the both diaphragms filled with gas. The pressure pulsation reduction mechanism 9 is also configured such that, when the both sides of the pressure pulsation reduction mechanism 9 are loaded with a low pressure pulsation, the pressure pulsation reduction mechanism 9 changes the volume so that the low pressure pulsation is reduced.

The plunger 2 is made up of a large-diameter part 2a to slide on the cylinder 6 and a small-diameter part 2b to be slide on the plunger seal 13. The diameter of the large-diameter part 2a is set greater than the diameter of the small-diameter part 2b, and both are set coaxial to each other. Between the lower end of the cylinder 6 and the plunger seal 13, there is provided a circular low pressure seal chamber 10f, and the circular low pressure seal chamber 10f provided in the cylinder holder 7 communicates with the low pressure fuel flow path 10c through low pressure fuel communication paths 10d and 10e, and a circular low-pressure path 10h. Since a stepped part 2c between the large-diameter part 2a and the small-diameter part 2b is located in the circular low pressure seal chamber 10f, when the plunger 2 repeats a sliding motion in the cylinder 6, the stepped part between the large-diameter part 2a and the small-diameter part 2b repeats an up-and-down motion in the circular low pressure seal chamber 10f, hence changing the volume of the circular low pressure seal chamber 10f. In the suction stroke, the volume of the circular low pressure seal chamber 10f decreases, and the fuel in the circular low pressure seal chamber 10f flows to the low pressure fuel flow path 10c through the low pressure fuel communication paths 10d and 10e. In the return stroke and the discharge stroke, the volume of the circular low pressure seal chamber 10f increases, and the fuel in the low pressure fuel communication path 10d flows to the circular low pressure seal chamber 10f through the low pressure fuel communication path 10e.

In regard to the low pressure fuel flow path 10c, in the suction stroke, the fuel flows into the compression chamber 11 from the low pressure fuel flow path 10c, and on the other hand, the fuel flows into the low pressure fuel flow path 10c from the circular low pressure seal chamber 10f. In the return stroke, the fuel flows into the low pressure fuel flow path 10c from the compression chamber 11, and on the other hand, the fuel flows into the circular low pressure seal chamber 10f from the low pressure fuel flow path 10c. In addition, in the discharge stroke, the fuel flows into the circular low pressure seal chamber 10f from the low pressure fuel flow path 10c. As described above, since the circular low pressure seal chamber 10f has a function to help the fuel get in and out of the low pressure fuel flow path 10c, the circular low pressure seal chamber 10f is effective to reduce the pressure pulsation of fuel created in the low pressure fuel flow path 10c.

REFERENCE SIGNS LIST

1 pump housing
2 plunger
2a large-diameter part
2b small-diameter part
3 tappet
5 cam
6 cylinder
7 cylinder holder
8 discharge valve unit
9 pressure pulsation reduction mechanism
10a low pressure fuel suction opening
10b, 10c low pressure fuel flow path
10d, 10e low pressure fuel communication path
10f circular low pressure seal chamber
11 compression chamber
12 fuel discharge port
13 plunger seal
20 fuel tank
21 feed pump
23 common rail
24 injector
26 pressure sensor
27 engine control unit (ECU)
30 electromagnetic suction valve
31 moving element
31a rod
31b anchor
31c anchor inner periphery
31d anchor communication hole
31e anchor sliding part
32 valve seat
33 core
34 anchor spring
35 suction valve holder
38 suction valve spring 39 suction valve
52 electromagnetic coil

The invention claimed is:

1. A high pressure fuel supply pump with an electromagnetic suction valve, the electromagnetic suction valve comprising:
a suction valve that is contactable to and separable from a suction valve seat;
an anchor that is configured to move toward a core by magnetic attractive force generated between the anchor and the core; and
a rod that is movable and separable relative to the anchor and the suction valve, wherein
when the rod is in contact with the anchor and the suction valve, a clearance between the anchor and the core is set greater than a stroke between the suction valve and the suction valve seat, and
wherein in a state where an electromagnetic coil for generating the magnetic attractive force is supplied with current, the rod is configured to separate from the anchor after the rod separates from the suction valve.

2. The high pressure fuel supply pump with electromagnetic suction valve according to claim 1, further comprising:
a spring that biases the rod in a valve-opening direction against the magnetic attractive force, wherein
the rod is configured to stop moving by a biasing force of the spring after the anchor stops moving.

3. The high pressure fuel supply pump with electromagnetic suction valve according to claim 2, wherein the anchor has:
a first through hole into which the rod is inserted; and
a second through hole that communicates a space in which the spring is arranged with an outside of the space.

4. The high pressure fuel supply pump with electromagnetic suction valve according to claim 1, further comprising a rod guiding member, wherein
the rod guiding member has:
a sliding part by which the rod is slidably held; and
a communication hole that communicates a first space on a side of the suction valve with a second space on a side of the anchor.

5. A high pressure fuel supply pump with an electromagnetic suction valve, the electromagnetic suction valve comprising:
a suction valve that is contactable to and separable from a suction valve seat;
an anchor that is configured to move in a valve-closing direction away from the suction valve by magnetic attractive force and is configured to stop moving by colliding with a core; and
a rod that is configured to move the suction valve and the anchor in a valve-opening direction opposite to the valve-closing direction and is able to separate from the suction valve and the anchor in a valve-closing direction, wherein
when the suction valve is in a valve-opened state, a clearance between the anchor and the core is set greater than a stroke between the suction valve and the suction valve seat.

6. The high pressure fuel supply pump with electromagnetic suction valve according to claim 5, further comprising:
a spring that biases the rod in the valve-opening direction, wherein
the rod is configured to stop moving by a biasing force of the spring after the anchor stops moving.

7. The high pressure fuel supply pump with electromagnetic suction valve according to claim 6, wherein the anchor has:
a first through hole into which the rod is inserted; and
a second through hole that communicates a space in which the spring is arranged with an outside of the space.

8. The high pressure fuel supply pump with electromagnetic suction valve according to claim 5, wherein
in a state where an electromagnetic coil for generating the magnetic attractive force is supplied with current, the rod is configured to separate from the anchor after the rod separates from the suction valve.

9. The high pressure fuel supply pump with electromagnetic suction valve according to claim 5, further comprising a rod guiding member, wherein
the rod guiding member has:
a sliding part by which the rod is slidably held; and
a communication hole that communicates a first space on a side of the suction valve with a second space on a side of the anchor.

* * * * *